(12) United States Patent
Goelff

(10) Patent No.: US 8,057,905 B2
(45) Date of Patent: Nov. 15, 2011

(54) FIRE RESISTANT GLAZING

(75) Inventor: Pierre Goelff, Jumet (BE)

(73) Assignee: AGC Glass Europe, Brussels (BE)

( * ) Notice: Subject to any disclaimer, the term of this patent is extended or adjusted under 35 U.S.C. 154(b) by 0 days.

(21) Appl. No.: 12/094,632

(22) PCT Filed: Nov. 23, 2006

(86) PCT No.: PCT/EP2006/068839
§ 371 (c)(1),
(2), (4) Date: Sep. 15, 2008

(87) PCT Pub. No.: WO2007/060203
PCT Pub. Date: May 31, 2007

(65) Prior Publication Data
US 2009/0148708 A1    Jun. 11, 2009

(30) Foreign Application Priority Data

Nov. 25, 2005  (EP) .................................... 05111299

(51) Int. Cl.
*B32B 17/06*  (2006.01)
(52) U.S. Cl. ......... 428/428; 428/432; 428/701; 428/702

(58) Field of Classification Search .................. 428/428, 428/432, 701, 702
See application file for complete search history.

(56) References Cited

U.S. PATENT DOCUMENTS

| 3,492,137 | A |   | 1/1970  | Iler |
| 3,721,574 | A | * | 3/1973  | Schneider et al. ............ 106/623 |
| 4,190,698 | A | * | 2/1980  | De Boel et al. ................ 428/334 |
| 5,551,195 | A | * | 9/1996  | Vanderstukken ............ 52/171.3 |
| 5,565,273 | A |   | 10/1996 | Egli et al. |

FOREIGN PATENT DOCUMENTS

| DE | 2833385      | 2/1980  |
| WO | WO 02100636  | 12/2002 |
| WO | WO 03064801  | 8/2003  |

* cited by examiner

*Primary Examiner* — Gwendolyn Blackwell
(74) *Attorney, Agent, or Firm* — Oblon, Spivak, McClelland, Maier & Neustadt, L.L.P.

(57) ABSTRACT

A transparent fire-resistant glazing which includes at least one intumescent layer of a hydrated alkaline metal silicate between two glass sheets. The intumescent alkaline metal silicate layer has an $SiO_2/M_2O$ molar ratio between 3.5 and 7 and a water content from 33 to 43% by weight. Their preparation incorporates a drying step.

20 Claims, 3 Drawing Sheets

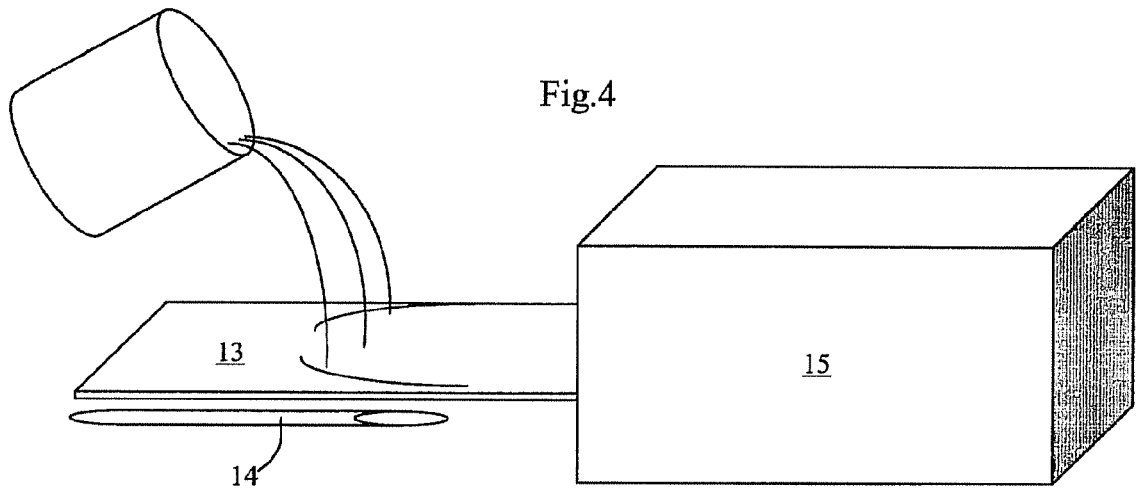
Fig.4
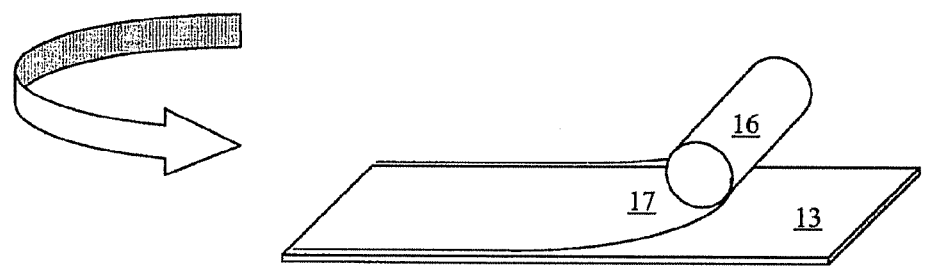
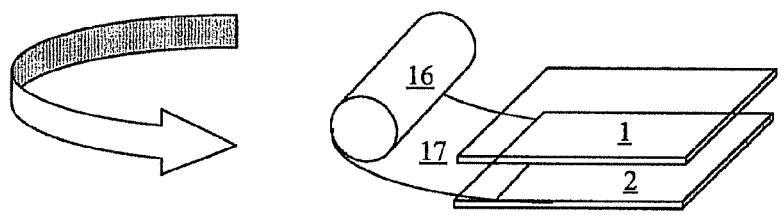

FIRE RESISTANT GLAZING

CROSS-REFERENCE TO RELATED APPLICATIONS

This application is the U.S. National Entry of PCT/EP/2006/068839 filed Nov. 23, 2006, and claims priority from European Application 05111299.3, filed Nov. 25, 2005, the disclosures of both of which are hereby incorporated by reference.

The present invention relates to fire-resistant glazing units comprising at least one layer of a hydrated alkali metal silicate for which exposure to fire generates the formation of an opaque foam which opposes the transmission of radiation and supports the glass sheets with which the alkali metal silicate layer or layers are combined.

The use of hydrated alkali metal silicates in the manufacture of fire-resistant glazing units is carried out according to two distinct modes.

The first mode comprises products in which the silicate layer or layers are formed from commercial solutions of these silicates, solutions to which various additives which improve the properties and/or the processing conditions thereof are added. Starting from these solutions, the layers are obtained by spreading the solution over a support and by carrying out a more or less prolonged drying step until a solid layer is obtained. The layer of silicate thus formed, optionally directly on a glass sheet, is then enclosed in a laminated assembly between two glass sheets, in an heating operation.

For this first family of products, the preparation conditions, and particularly the drying conditions, are relatively restrictive.

The water content of commercial sodium silicate solutions is a function of the Si/Na molar ratio on which the more or less "refractory" nature of the products formed depends. It is around 65% by weight for a molar ratio of 3.3 and around 45% for a molar ratio of 2. These industrial solutions are adjusted to maintain a suitable viscosity for their users. At the values indicated above, the viscosity lies at around 100 mPa·s.

For molar ratios of around 3.3, the dried products based on sodium silicate should have a restricted water content of around 20 to 25%. For higher water contents, these products are generally less stable to ageing. Over time it is difficult to guarantee that they will remain perfectly transparent. A haze is often formed which becomes more pronounced as time passes. It should be emphasized that the appearance of this haze is even more frequent when the water content is higher. This is the reason why this content is systematically kept relatively low, in other words why the drying should be more advanced.

Conventional drying is carried out in ovens in which temperature, hygrometry and ventilation must be accurately controlled, following cycles for which the duration is even longer when the initial content of water is higher. This duration adds up to tens of hours.

The choice of this route of drying from industrial alkali metal silicates also has consequences as regards the mechanical qualities of glazing units that incorporate these silicate layers. The very low water content does not make it possible to have very "plastic" layers. The consequence is a limitation of the resistance known as the "soft impact" resistance, which is necessary in certain applications, especially in external glazing units, and which must be compensated for by a particular structure, for example by combination with laminated sheets comprising an interlayer of a thermoplastic material.

A second mode relates to products in which a silicate solution for which the water content is initially relatively "low", for example around 45 to 60%, is modified by the addition of products qualified as "hardeners", "crosslinking agents" or in yet another way. These qualifications generically denote products which promote gelling of the silicate solution. They are chosen carefully so that, after their addition to the silicate solution, the latter, when left at rest, spontaneously hardens over a relatively short time, without it being necessary to carry out a drying step.

For these products, before formation of the gel, the solution with its additives is poured between two glass sheets that define an enclosed space. A seal located at the periphery of the glass sheets joins them together in a leaktight manner and supports the solution while it gels.

The absence of a drying step forms a definite advantage as regards the mode of production. The products in question obviously retain a relatively high water content. This is because it is not possible to reduce the initial content of the silicate solution without causing a premature gelling, which makes subsequent processing impossible.

Under certain conditions, the presence of this relatively abundant water may be less favorable to the fire resistance of these products. A large amount of water may lead to a lack of cohesion of the glazing unit or to the formation of a very irregular "foam" that damages the integrity of the sheet rendered fireproof. So that these products have the "mechanical" qualities required to be fireproof, use is made of means which substitute their properties for those of the intumescent layer. For example, instead of a single sheet of annealed glass, use is made of toughened glass or better of laminated glazing units comprising a thermoplastic interlayer. These solutions increase the cost of the products.

Proposals have been made which, in a certain way, attempt to improve the techniques that use gelling. Thus, the publication WO 02/100636 teaches the use of solutions that are sufficiently rich in water (more than 60%) so that the product can be easily poured between the glass walls. Once the product is between the sheets, it is subjected to electromagnetic irradiation at a very high frequency that results in it gelling. Prior to the introduction between glass sheets, the solution is degassed via an ultrasound treatment. The implementation of this technique reveals a certain complexity which makes it not very attractive.

Whether it is a question of techniques for forming via drying or of those comprising a gelling step, numerous improvements have been proposed. These proposals develop, more or less significantly, the compromise between the ease and rapidity of manufacture on the one hand and the properties of the resulting products on the other hand. These improvements focus both on the manufacturing techniques and on the compositions used.

On the subject of techniques, mention may be made of the use of a controlled atmosphere during drying in particular to prevent the formation of bubbles in the product during the ageing thereof. In this sense, the use of oxygen instead of air in the drying chambers is advantageous. Still regarding the techniques, it has been proposed to replace the "static" drying carried out in chambers in which sheets of glass coated with a layer of a silicate composition to be dried are stored, with a "dynamic system" in which the composition to be dried is deposited in the form of a film on a support conveyor, which continuously progresses through a tunnel-type drying oven. The allotted drying time under these conditions is inevitably shorter than that for drying in chambers, and, considering that the drying time increases more rapidly than the thickness of the layer, for a given final water content, the layers obtained under these conditions can only have a very limited thickness relative to those obtained during static drying.

The compositions are also the subject of multiple proposals for improving or adjusting the products in question to particular requirements.

Generally, the prior publications, which may or may not relate to dried products, propose the use of sodium, potassium or lithium silicates or else mixtures thereof. Nevertheless, most often it is sodium silicate which is used. The use of potassium silicate has mainly been proposed for improving the ageing resistance of layers subjected to UV radiation, and in the formation of gels for soft impact resistance.

In order to obtain products that offer particularly high fire resistance, it has been proposed to increase the refractory nature of the layers, in other words mainly by increasing the Si/alkali metal ratio. This increase in the refractory nature is not necessarily favorable to the optical properties of the glazing units formed. It is obtained, for example, by introducing finely divided silica into the initial composition.

Also conventionally, the addition of glycerol or of a polyol into the composition is used to improve the mechanical properties of the intumescent layers by giving them a certain plasticity. In return, the presence of glycerol intervenes in a negative manner on the drying speed of the layers.

Other types of additives have also been proposed, and among these various surfactants which promote the wetting of the substrates with which the alkali metal silicate solution is in contact.

The prior proposals result from various compromises between all sorts of requirements that apply to this type of product. Alternative solutions are however necessary for the reasons indicated previously in order to improve the production conditions and/or the properties of the products.

The inventors have sought a production route that leads, in particular, to products for which the water content is sufficient to confer the necessary mechanical qualities, especially that of "soft impact" resistance without however damaging the fire-resistance properties.

At the same time, the inventors had the objective of providing a method for producing intumescent layers which are less restrictive than those using the drying techniques indicated above.

An in-depth study of the conditions for forming intumescent layers both by drying and by formation of gels has made it possible to highlight the results which are the subject of the invention and which correspond, for the most part, to the targeted objectives.

In particular, and very unexpectedly, it has been shown that by following a specific preparation mode, compositions of alkali metal silicates having a marked refractory nature, namely for which the $SiO_2/M_2O$ molar ratio is between 3.5 and 7, and preferably between 4 and 6, and for which the water content is established between 33 and 43% and preferably between 35 and 42% and particularly preferably between 36 and 41%, very widely satisfy the objectives indicated previously.

The percentages indicated are by weight, and are expressed for the compositions. In the presence of additives that modify the compositions, these can be deducted from the water content. This is particularly the case for organic products introduced such as glycerol or surfactants.

It should be emphasized that the prior products obtained by drying industrial solutions of silicates which would have these compositions are not suitable. In principle, it should be possible to limit the drying in order to attain compositions having these relatively high water contents. However, in practice, the products obtained under these conditions are not transparent. The "haze" is so sizable that the products are at best only translucent. Similarly, for the products that are the subject of a gelling step, such low water contents cannot be used. For compositions of this type, the formation of the gel is instantaneous.

The inventors have shown that it is possible to solve these difficulties by carrying out the formation of the final composition in two steps. Firstly, it is a question of producing a solution for which the $SiO_2/M_2O$ molar ratio lies within the limits indicated previously, and for which the water content is as limited as is permitted by the absence of gelling under these conditions, especially ambient temperature.

The solution at this stage comprises a water content which is not less than 45% (not taking into account optional additives) and is as low as possible to retain the advantage of an extremely reduced subsequent drying step. The minimum water content is also a function of other features, in particular the nature of the alkali metals present and of the $SiO_2/M_2O$ molar ratio.

The industrial solutions of alkali metal silicates available may have a water content that is even lower when the molar ratio is itself lower. Thus, for industrial hydrated sodium silicates, the water content is around 65% for a molar ratio of 3.3, and 45% for a ratio which is only 2. It has, however, been necessary to especially prepare solutions which are not available industrially, for which the water content may be as low as 40% for a molar ratio of 1.5. The preparation of solutions having a low molar ratio therefore makes it possible to limit the initial water content. But for all these solutions, the molar ratio is far from enough to result in useful products. In any case, it is advisable to increase the molar ratio in order to bring it to the required values. For this purpose, according to the invention, it is necessary to add to the silicate solution a suitable amount of a silica-based compound capable of reacting with the initial silicate solution.

The compounds used to increase the silica content of the mixture are of the colloidal silica type. According to the invention, in order to obtain an incorporation which results in a homogenous mixture, the colloidal silica is added in the form of an aqueous suspension. Commercially available suspensions of this type may be relatively rich in silica. The highest contents are around 45 to 50%. So as not to increase the water content of the mixtures, it is of course preferable to use solutions containing the highest levels of silica available.

The relative proportions of silicate solution on the one hand and of colloidal silica on the other hand are the subject of a necessary compromise. It is a question, while increasing the molar ratio of the mixture at the same time, of leading to a solution as rich in solids as possible. Although it seems preferable to start from a silicate solution having a low water content, as indicated above, this leads to a relatively low molar ratio and consequently to the necessity of adding a large amount of colloidal silica and vice versa, but since the silica in suspension introduces an amount of water which is not less than around 50% of the weight added, it is seen that the optimization does not allow very large variations in order to keep the products mixed in a water content as low as is desired.

For these mixtures if, as indicated, the water content is not less than around 45%, it is endeavored, preferably, not to exceed 55% and better still not more than 50%.

Such a content is obtained, for example, by starting from a silicate solution, which has been specially prepared, having a molar ratio of 1.5 for which the water content does not exceed 40%, and a suspension of colloidal silica containing 50% of silica, until a molar ratio, for example of 5, and a water content that follows from these choices and that is established at around 46%, is obtained.

In order to prepare the solutions in question, it is also possible to start from a suspension of colloidal silica and alkali metal hydroxide. The latter is either in the form of a solution or at least partly in the form of solid pellets in order to limit the water content of the mixture as much as possible. The concentrations of the hydroxide solutions may be relatively high. The content of metal oxides reaches 42% in solution from 20° C. onwards and at least 85% in pellets.

The reproducibility of the compositions and the consistency of the properties of the products obtained are even better ensured since the preparation of the compositions comprises the use of individualized chemicals. The industrial silicates sold offer a certain inconsistency in their behavior for the same supposed qualities. Nevertheless, for reasons of economy, it is useful to retain the at least partial use of industrial alkali metal silicates for the production of these compositions.

In this state, the solution prepared is sufficiently stable to ordinary ambient temperature conditions. It may be stored for several hours, or even several days if necessary by cooling it, without risk of forming a gel. It is possible to take advantage of this stability in order to remove the bubbles which may have appeared when mixing the mixture. The removal may take place by simply leaving the solution at rest or by any other known technique such as the use of ultrasounds or vacuum degassing for example.

The solutions thus obtained, which have a water content still greater than 45%, are then subjected to a limited drying in order to bring them to the concentration of 35 to 43% of water according to the invention.

The removal of some of the water is then carried out on a composition for which the exchange surface is as vast as desired, and not in the confinement of the space between the glass sheets after the solution has filled this space. The removal may therefore be carried out in a relatively easy manner and even faster since the amount of water which must be removed is not very large.

When the removal is undertaken, it goes without saying that it can advantageously only be on a limited scale insofar as it is initially endeavored to treat solutions for which the water content is as low as the available products allow on the one hand and, on the other hand, the content remaining must be sufficient to prevent premature gelling.

Under these conditions, when a partial removal of the water from the composition is carried out, this removal generally represents at most 10% by weight of the initial composition and preferably not more than 5%.

The drying of these compositions for which the initial water content is low and the removal limited, has remarkable particularities compared to the drying techniques conventionally used.

Due to the fact that drying only results in the removal of a small proportion of water, the duration of this drying is relatively short. Thus, while, in conventional techniques, the drying cycles extend, for example, over 32 hours or at least 24 hours in order to treat layers which, once dried, are around 1 millimeter in thickness, in the case of compositions according to the invention the drying time is ordinarily less than one hour under similar temperature conditions and may be even shorter.

In fact, in the drying operations, the treatment time is not uniform throughout the whole time. The lower the residual amount of water in the composition is, the more the removal becomes difficult, and the longer the operation is. It is understood that, since the water content of the layers prepared according to the invention is far greater than that of the layers obtained conventionally by drying, the drying time may be considerably reduced.

The fact of being able to reduce the drying time considerably makes it possible, on the other hand, to produce much thicker layers without the treatment time becoming prohibitive. Under conventional conditions, the thickness of the layer obtained does not normally exceed 2 mm in order to keep the drying within acceptable times. Even doing this, as indicated previously, the drying cycles are extremely long.

The limitation of the drying means that it is possible, according to the invention, to produce layers that reach or exceed 10 mm in thickness in an acceptable time.

The use of thick layers may result in products that are substantially different to those normally available. For example, the fire-resistant qualities which result, in conventional techniques, in increasing the number of layers and simultaneously of glass sheets which support them, may be replaced by thicker layers and a lower number of glass sheets. In other words, it is possible, by this means, to reduce the thickness, the weight and the cost of the glazing unit for a same final quality.

In order to form thick layers it is nevertheless preferable, according to the invention, to superpose layers of lesser thickness, for example of 1 or 2 mm. This way of proceeding is even more advantageous since the drying of thin layers, which is carried out in a very short time, makes the techniques in which the drying operations take place continuously particularly advantageous.

Although conventionally the drying is carried out in "batches" in enclosed chambers that are regulated as regards the temperature, hygrometry and circulation of the atmosphere, it is advantageous according to the invention, taking into account the reduction in the time of the operation, to carry out the drying operation in installations that operate continuously. For example, the compositions spread over a support travel through a tunnel type oven, the residence time in the oven corresponding to the drying time.

The support for the compositions to be dried may be composed of one of the sheets intended to form the glazing unit. In this case, once the drying is carried out, the sheet coated with the intumescent layer is combined with at least one other sheet under conventional assembly conditions, for example by passing through an oven or calendering.

In the case of the invention, the support is advantageously composed of a conveyor belt which transports the layer the whole way along the drying step. The layer is then separated from its support in order to be introduced into the structure forming the glazing unit. In the elementary form, the sheet is introduced between two glass sheets, the assembly being joined together during customary operations in this field. As indicated above, the assembly may also comprise a plurality of intumescent layers superposed in order to form an overall larger thickness.

The production of the glazing units according to the invention is represented schematically in the appended figures in which:

FIG. 4 is a diagram of the variant of one part of the mode of production in which the drying is carried out continuously on a conveyor belt.

The base component of the transparent fire-resistant glazing units is systematically composed of an intumescent layer 3, held between two glass sheets 1 and 2. The glass sheets are, as represented, monolithic or, where appropriate, composed of a laminated assembly including an interlayer, for example of polyvinylbutyral type.

On the basis of this component, commercial fire-resistant glazing units are developed, especially by combining in one and the same assembly several intumescent layers and several glass sheets, that are identical or different depending on the envisaged use. In practice, for glazing units formed with intumescent layers obtained by drying, the multiplication of layers has the objective, in particular, of increasing the fire-resistant properties, the multiple intumescent layers adding their effects together, this for want of being able to easily prepare sufficiently thick layers for the reasons indicated previously.

Figure 2:
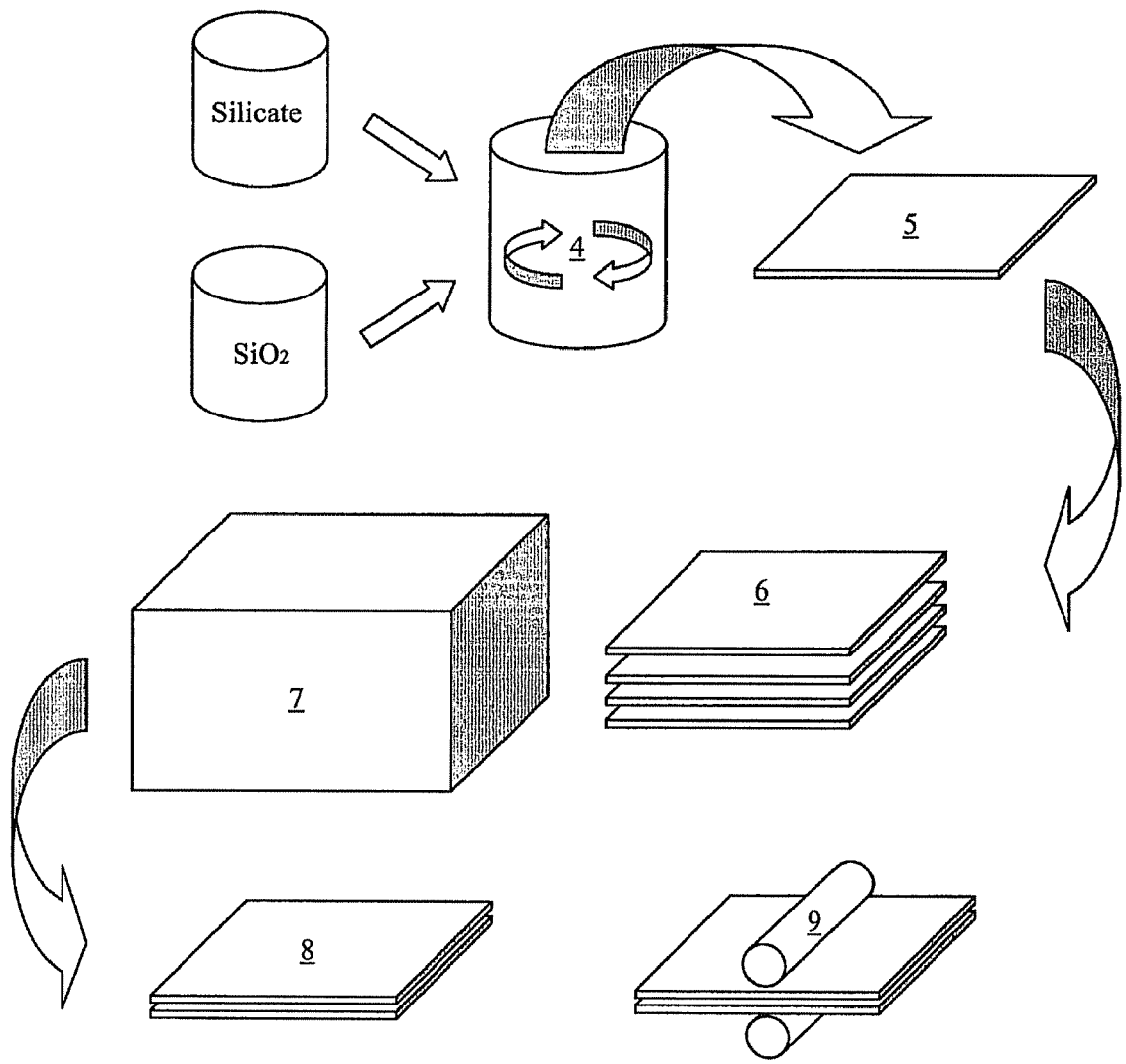
FIG. 2 is a diagram of the mode of production from the formation of the compositions to the final glazing unit.

FIG. 2 schematically presents various steps for producing a glazing unit according to the invention, some of these steps being taken from conventional techniques as is indicated below. The main differences with these prior techniques lie in the preparation of the composition and in the drying conditions.

The preparation of the silicate composition involves, as indicated previously, the mixing of an alkali metal silicate and of colloidal silica or, optionally, of an alkali metal hydroxide and colloidal silica. The mixing is carried out in order to arrive at suitable compositions according to the invention, namely a water content (not taking into account optional organic additives) which is not less than 45% by weight and at most 55% by weight, with an $SiO_2/M_2O$ molar ratio between 3.5 and 7.

The mixing is carried out with stirring to properly homogenize the composition as represented in 4. The composition is degassed to remove the bubbles optionally present after this mixing. The preparation which may be kept in a refrigerated chamber for several days without forming a gel is then applied to a support represented in 5 by a glass sheet.

The intumescent composition is stable at around 4° C. Due to its relatively low water content, a significant raising of the temperature promotes the rapid gelling thereof. This property may be advantageous in the operation of applying the composition to the support used during drying. In the usual techniques having a drying step, it is necessary to keep the liquid solution on the support by a bead placed at the periphery of the support. A bead of a silicone polymer or a mineral bead is normally used. This bead does however generate costs and possible defects in the zone of the layer which is in contact with this bead.

Figure 1:
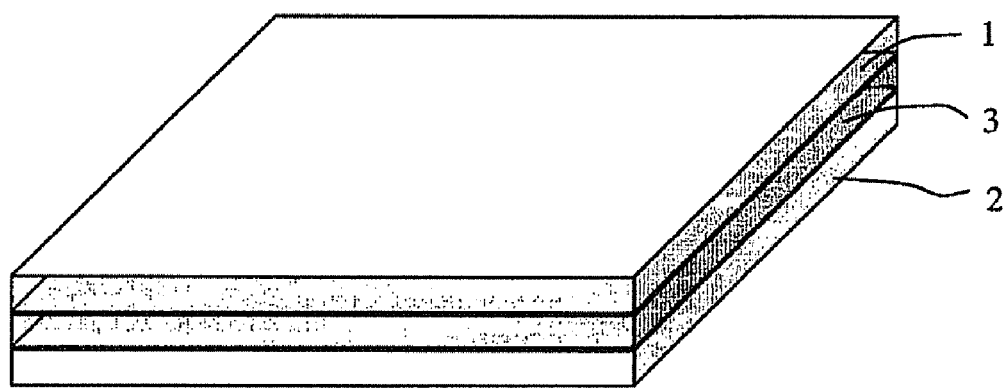
FIG. 1 is a schematic perspective view of an individual fire-resistant glazing unit according to the invention.
Figure 3:
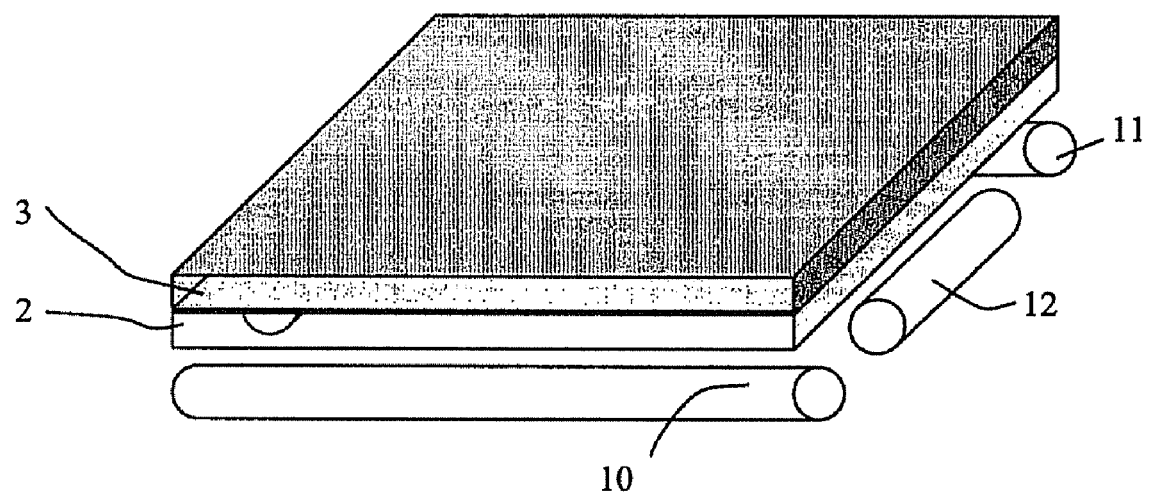
FIG. 3 illustrates an advantage relating to the application of the intumescent composition onto a support.

It is possible according to the invention to replace this bead by instantaneous formation of the gel along the edges of the support. This gel makes it possible to retain the composition which is still fluid. In order to be sure to create this gel bead, it is possible to preheat the perimeter intended to confine the liquid composition so that this composition in contact with the locally heated support is gelled. The heating of the support 2 is represented in FIG. 3. The heating is obtained, for example, by means of resistance heaters that extend over the support 2 (in the case presented, a glass sheet), the resistance heaters shown schematically as 10, 11, 12, etc. The heating may also be obtained radiantly, and directly above the composition 3 applied to the support. This arrangement represented in the case of individualized support elements is also applicable in the case of the support formed from a continuous conveyor belt.

The use of the gel of the composition to retain this composition over the whole of the support is even more advantageous since it prevents any possible contamination of the intumescent layer by products which are foreign to it. The zone forming this gel does not have exactly the same characteristics as the remainder of the layer at the end of the process. It is therefore removed during trimming of the margins that is in any case necessary for the finishing of the product.

The glass sheets 6 coated with the composition to a thickness of a few millimeters at most under conventional conditions and which may be greater in the case of the invention, are then transferred into a drying chamber 7. There they are subjected to a hot ventilated atmosphere having controlled hygrometry and atmosphere, following a precise cycle. In the case of the compositions according to the invention, this drying step is relatively brief. For this reason, this drying is advantageously carried out continuously (not represented in FIG. 2), the coated sheets 5 being passed into a tunnel-type oven.

As indicated previously, the application of the composition and its drying may also be carried out on a continuous support, the layer then being recovered in the form of a strip. This variant is illustrated in FIG. 4. The silicate solution prepared as before is poured onto the conveyor 13, which is preferably made of a polymer material that does not adhere to the sheet of silicate prepared. Preheating the edges of the belt with resistance heaters 14 that extend along its edges make it possible to set the solution thus forming a "bead" which retains the fluid solution on the belt. The thus coated belt then passes into the drying oven 15. On exiting the drying oven, the dried sheet of silicate 17 is separated from the conveyor belt 13 and optionally wound around itself as represented in 16. To prevent the turns from adhering to one another, the sheet may be "interleaved" with an interlayer during storage. The sheet of silicate thus prepared may then be assembled with the glass sheets 1 and 2.

After drying, the finishing operations of the glazing units are carried out in a conventional manner. The sheets of glass coated with the intumescent layer are assembled with other glass sheets optionally also comprising an intumescent layer according to a more or less complex assembly, or in the case of the sheet of silicate without a glass sheet support during drying, it is positioned between two glass sheets 1 and 2.

In the two cases presented previously, the finishing operation is analogous. The assemblies formed as in 8 are then permanently attached during an operation which may be a hot calendering operation as represented in 9, or by passing into an autoclave still according to the conventional techniques in this field.

The following examples are given by way of indication of modes of preparing intumescent layers according to the invention.

EXAMPLE 1

101.6 parts of a commercial potassium silicate composed, by weight, of 26.8% of $SiO_2$, 14.5% of $K_2O$, 0.3% of $Na_2O$ and water were mixed with 20 parts of 85.6% KOH pellets.

100 parts of the solution formed were withdrawn, of which 6.83 parts were removed by evaporation to obtain a silicate having a silica/alkali metal oxides molar ratio of 1.44, composed of 50% by weight of metal oxides and water.

Next, 90.6 parts of the silicate with the molar ratio of 1.44 were mixed with 100 parts of a 50% dispersion of colloidal silica (Ludox® TM-50) and with 14.6 parts of 99.5% glycerol in order to obtain, after a short period of stabilization, a transparent sol having a silica/alkali metal oxides molar ratio of 4.6 and containing 46.2% of water and 7% of glycerol.

This sol remained fluid long enough to be able to be degassed under vacuum without significant evaporation and to be able to be poured over a glass sheet bordered by a barrier so that the thickness of the silicate layer was 2 mm. The sample was placed in a ventilated oven under a controlled atmosphere and was dried at 60° C. The sample was removed after 120 minutes. Its concentration of water had been reduced to 38%. The layer was clear and transparent and adhered to the glass support. A glass sheet was applied to the layer by the technique of calendering. A protective strip was bonded to the periphery of the laminated glass glazing unit obtained. After one year, the sample, which was still transparent, was cut in two. One half was placed in an oven at 200° C. and the other half was placed in the presence of an electric furnace brought to 600° C. In both cases, an insulating foam that adhered to the glass sheets was formed.

EXAMPLE 2

100 parts of a 50% dispersion of colloidal silica (Ludoxe TM-50) was mixed with 38.7 parts of a 50% KOH solution and with 10.4 parts of 99.5% glycerol in order to form, after a short period of stabilization, a transparent silicate with a molar ratio of 4.6 containing 48.2% by weight of metallic oxides and 7% of glycerol.

This sol remained fluid long enough in order to be able to be degassed under vacuum without significant evaporation and to be able to be poured over a glass sheet bordered by a barrier so that the thickness of the silicate layer was 4 mm.

The sample was placed in a ventilated oven under a controlled atmosphere and was dried at 80° C. The sample was removed after 185 minutes. Its concentration of water had been reduced to 35%. The layer was clear and transparent and adhered to the glass support. A sheet of glass was applied to the layer by the technique of calendering. A protective strip was bonded over the perimeter of the glass. The sample was cut into three. One third was placed in an oven at 80° C. for one month and remained clear and transparent. One third was placed in an oven at 200° C. and the last third was placed in the presence of an electric furnace brought to 600° C. In the last two cases, an insulating foam that adhered to the glass sheets was formed.

EXAMPLE 3

100 parts of a 50% dispersion of colloidal silica (Ludox® TM-50) were mixed with 122.6 parts of a 50% KOH solution in order to form a transparent silicate having a molar ratio of 1.5 and containing 45.8% of metallic oxides.

100 parts of the solution formed were withdrawn and 23.6 parts were removed by evaporation to obtain a silicate having a silica/alkali metal oxides molar ratio of 1.5 composed of 60% metallic oxides and water.

Next, 69.1 parts of the silicate with a molar ratio of 1.5 were mixed with 100 parts of a 50% dispersion of colloidal silica (Ludox® TM-50) in order to obtain, after a short period of stabilization, a transparent sol having a silica/alkali metal oxides molar ratio of 5 and containing 45.6% of water.

100 parts of the sol were withdrawn and degassed under vacuum without significant evaporation. A thickness of 1 mm of this sol was poured over a glass sheet. The sample was placed in a ventilated oven under a controlled atmosphere and was dried at 80° C. The sample was removed after 16 minutes. Its concentration of water had been reduced to 41%. The layer was clear and transparent. A glass sheet was applied to the layer by the technique of calendering and autoclaving. A protective strip was bonded over the perimeter of the laminated glazing. The sample was cut in three. One third was placed in an oven at 80° C. for 1 month and remained clear and transparent. One third was placed in an oven at 200° C. and the last third was placed in the presence of an electric furnace brought to 600° C. In the last two cases, an insulating foam that adhered to the glass sheets was formed.

EXAMPLE 4

50 g of the sol from example 3 were kept in a sealed flask in a refrigerated chamber at 4° C. After 18 hours, the sol, which was still transparent and fluid, was poured over a toughened glass raised to 80° C. The sol set instantly in contact with the glass.

EXAMPLE 5

50 g of the sol from example 3 were kept in a sealed flask at 4° C. After 42 hours, the flask was reheated to 30° C. The sol was poured, to a thickness of 4 mm, over a glass sheet in a horizontal position, the 4 edges of which had been preheated to 60° C. The sol set on reaching the edges and retained the rest of the solution on the sheet.

The invention claimed is:

1. A transparent fire-resistant glazing unit comprising at least one intumescent layer of hydrated alkali metal silicate between two glass sheets,
    wherein the intumescent layer is prepared by drying an aqueous composition for one hour or less for each 1 mm of thickness of the intumescent layer,
    wherein the aqueous composition has a water content before drying which is not greater than 55%,
    wherein the intumescent layer has an $SiO_2/M_2O$ molar ratio between 3.5 and 7 (where M is an alkali metal), the molar ratio attained by the use of a colloidal silica in the aqueous composition, and
    wherein the intumescent layer has a water content of 33 to 43% by weight.

2. The glazing unit as claimed in claim 1, in which the molar ratio of the intumescent layer is 4 to 6.

3. The glazing unit as claimed in claim 1, in which the water content of the intumescent layer is 35 to 42% by weight.

4. The glazing unit as claimed in claim 1, in which the aqueous composition has, before drying, a water content which is not less than 45%.

5. The glazing unit as claimed in claim 1, in which the aqueous composition has a water content before drying which is not greater than 50%.

6. The glazing unit as claimed in claim 1, in which the aqueous composition is obtained by addition of an aqueous suspension of colloidal silica to a hydrated alkali metal silicate solution.

7. The glazing unit as claimed in claim 6, in which the alkali metal silicate solution has a water content of less than 45%.

8. The glazing unit as claimed in claim 5, in which the suspension of colloidal silica has a weight content of silica which is not less than 45%.

9. The glazing unit as claimed in claim 6, in which the hydrated alkali metal silicate solution is obtained, at least partly, by reaction of an alkali metal hydroxide with a suspension of silica.

10. The glazing unit as claimed in claim 9, in which the alkali metal hydroxide reacting with the suspension of silica is in solution.

11. The glazing unit as claimed in claim 1, in which the aqueous composition is applied to a support sheet as a uniform layer and dried until a required concentration of water is obtained.

12. The glazing unit as claimed in claim 11, in which the drying is performed by continuously passing through a tunnel oven.

13. The glazing unit as claimed in claim 11, in which the aqueous composition applied is set locally by raising a temperature at the time of its application.

14. The glazing unit as claimed in claim 11, in which the aqueous composition is applied as a layer, a thickness of which does not exceed 3 mm.

15. The glazing unit as claimed in claim 11, in which the support sheet is a sheet of glass incorporated into the composition of the glazing unit, at least a second sheet of glass being assembled with this first sheet coated with the dried intumescent layer.

16. The glazing unit as claimed in claim 11, in which the dried intumescent layer is detached from the support sheet present during drying, the intumescent sheet assembled with at least two sheets of glass.

17. The glazing unit as claimed in claim 11, in which the intumescent layer is formed by superposition of several previously dried layers.

18. A transparent fire-resistant glazing unit comprising at least one intumescent layer comprising silica and hydrated alkali metal silicate between two glass sheets, the intumescent layer having an $SiO_2/M_2O$ (where M is an alkali metal) molar ratio between 3.5 and 7 and a water content of 33 to 43%, the molar ratio attained by the use of a colloidal silica in an aqueous composition used to form the intumescent layer, the aqueous composition having a water content before drying of not greater than 55%,
wherein the intumescent layer is prepared by drying for one hour or less for each 1 mm of thickness of the intumescent layer.

19. The glazing unit as claimed in claim 18, in which the molar ratio of the intumescent layer is 4 to 6.

20. The glazing unit as claimed in claim 1, wherein the intumescent layer is prepared by drying for about three hours or less.

* * * * *